Jan. 30, 1968  J. A. BADALI ETAL  3,365,828
GRENADE LAUNCHER FOR ATTACHMENT TO A RIFLE
Filed June 25, 1965  5 Sheets-Sheet 2
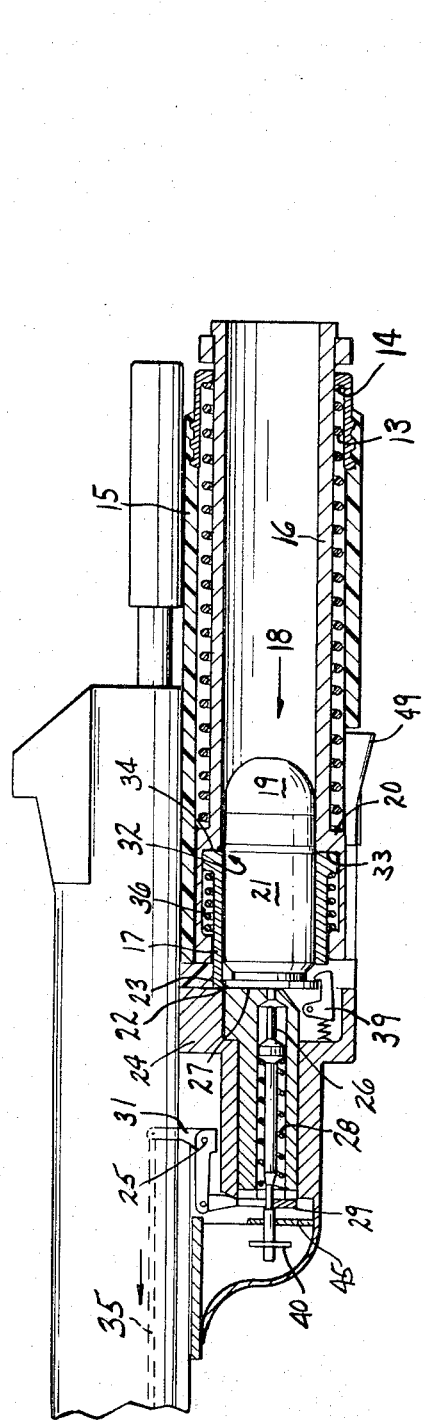
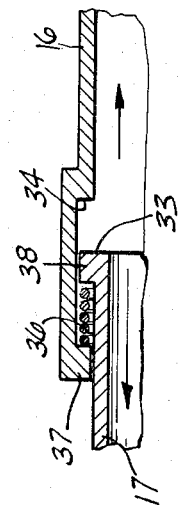
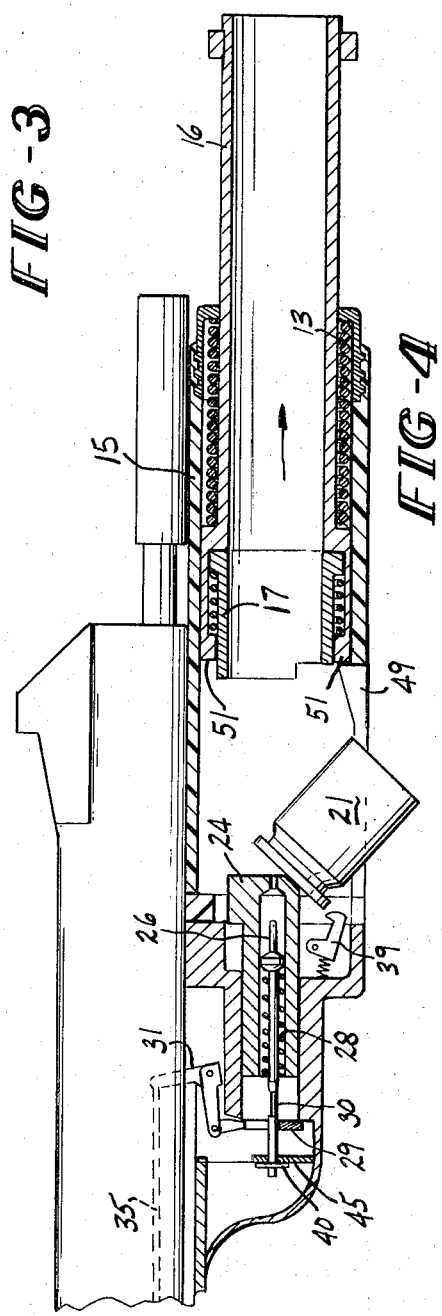
INVENTORS,
JOSEPH A. BADALI
JAMES H. JOHNSON
BY
R.S. Shutter
ATTORNEY

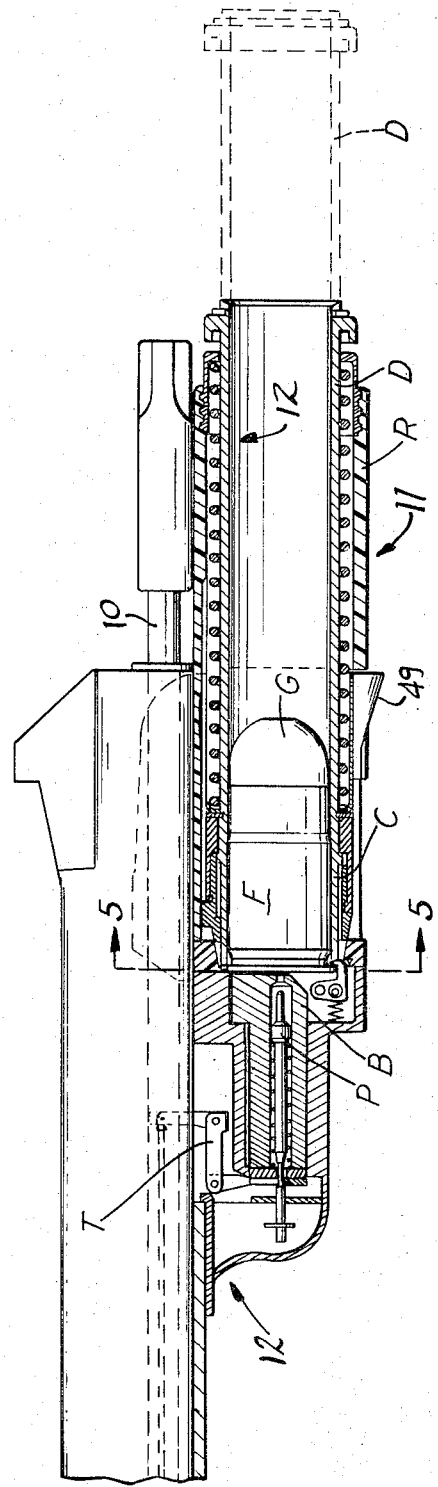

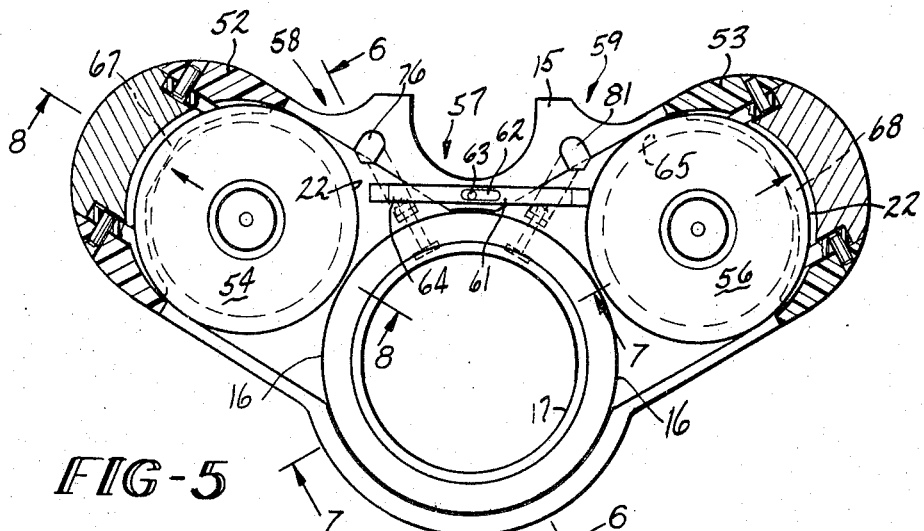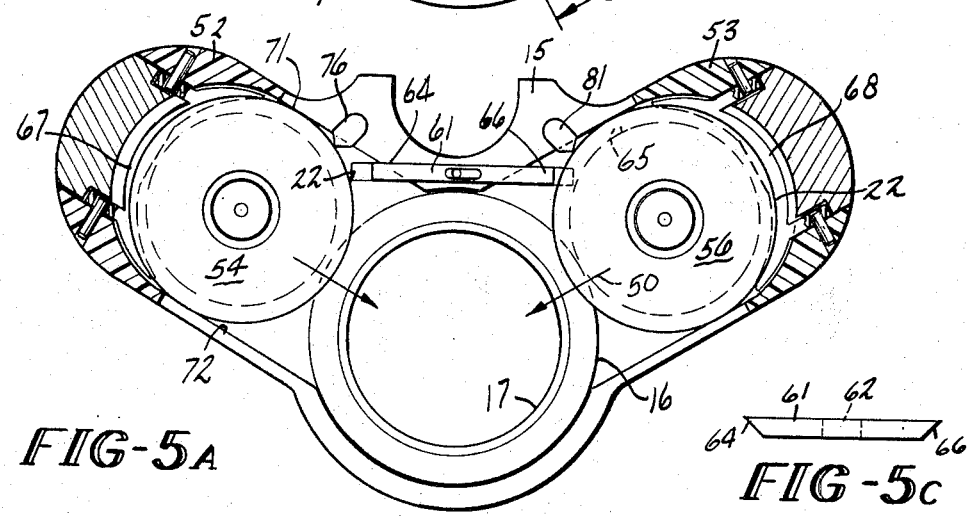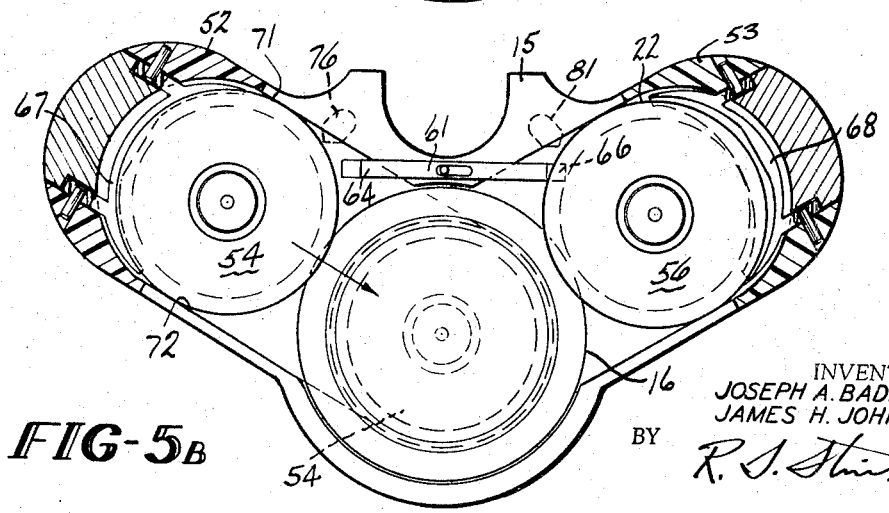

United States Patent Office 3,365,828
Patented Jan. 30, 1968

3,365,828
GRENADE LAUNCHER FOR ATTACHMENT
TO A RIFLE
Joseph A. Badali, Branford, and James H. Johnson, New
Haven, Conn., assignors to Olin Mathieson Chemical
Corporation, a corporation of Virginia
Filed June 25, 1965, Ser. No. 468,187
4 Claims. (Cl. 42—1)

The present invention relates to firearms and relates in particular to a firearm having a novel barrel and chamber arrangement.

It is a particular feature of the invention to provide a barrel with a movable chamber received telescopically within the barrel.

It is a further feature of the invention to provide a barrel and chamber of the type described which is slidably mounted within a housing or within a receiver so that upon firing a cartridge disposed in the chamber gas pressure generated upon firing is operative to drive the barrel in one direction and drive the chamber in the reverse direction.

It is a further feature of the invention to provide a novel magazine structure including switch means for selecting the sequence of feeding cartridges into the chamber.

It is a still further feature of the invention to provide a cut-off means operated by the motion of the barrel which, in cooperation with the switch means, controls feeding of cartridges.

It is a still further feature of the invention to provide a novel cartridge ejector means actuated by the barrel.

A further feature of the invention is the provision of a barrel including a movable telescoping chamber where the barrel makes a lost-motion connection with the chamber.

A further feature of the invention is the provision of the barrel and bolt assembly where the barrel has a lost-motion connection with the bolt.

A still further feature of the invention is the provision of a bolt, a barrel, and a chamber assembly which is operative, initially, to maintain a gas seal between the chamber and the bolt and thereafter operative, by virtue of both said lost-motion connections, to uncover a spent cartridge and eject the cartridge gas.

It is a still further feature of the invention to provide a firearm including a housing or a receiver in combination with a barrel and chamber assembly where a cartridge is chambered by telescoping the barrel and chamber assembly over the cartridge.

A still further feature of the invention is the provision of a firearm having a receiver, a barrel, and a separate chamber where the barrel and the chamber are movable relative to one another and movable relative to the receiver.

A firearm embracing certain features of the present invention may comprise a receiver, a barrel slidably mounted in the receiver and movable from a first position defining a ready-to-fire position to a second position defining a fired position, a cartridge chamber member telescopically received within the barrel and having a lost-motion connection with the barrel, a bolt carried by the receiver operative to close the chamber, said barrel and said chamber being formed with opposed pressure surfaces exposed to gas pressure generated upon firing a cartridge, said gas pressure operating upon said surfaces being effective by virtue of said lost-motion connection to drive the barrel toward said second position and being further effective to drive the chamber into tight contact with said bolt.

Another firearm embracing certain features of the present invention may comprise a receiver, an axially movable barrel slidably mounted in the receiver and movable from a first position defining a firing position to a second position defining a fired position, a floating cartridge chamber telescopically received in the barrel, a bolt carried by the receiver operative to close the chamber, a plurality of magazine pods formed in the receiver and communicating with the chamber when the barrel is in the second position and switch means in the housing for selecting the sequence of feeding cartridges from the pods to the chamber.

Other features and advantages of the present invention will become more apparent from an examination of the succeeding specification and claims when read in conjunction with the drawings, in which:

FIG. 1 is a vertical section of a grenade launcher representing one embodiment of the invention and shown fastened to the underside of a rifle barrel;

FIG. 2 is a vertical section, drawn schematically, of the launcher of FIG. 1 showing the launcher in the ready-to-fire position;

FIG. 3 is a sectional view of a portion of FIG. 2 showing the relative position between the chamber and the barrel at a very short interval after firing;

FIG. 4 is a view similar to FIG. 2 showing the barrel and chamber in the fired position and showing the ejection of a spent cartridge case;

FIG. 5 is a sectional view of FIG. 1 in the plane of the line 5—5 and as viewed in the direction shown by the arrows;

FIGS. 5A and 5B are similar to FIG. 5 and illustrate, in combination with FIG. 5, the various positions of the cartridge cut-offs and the switch means;

FIG. 5C is a plan view of the magazine switch bar;

Figure 6:
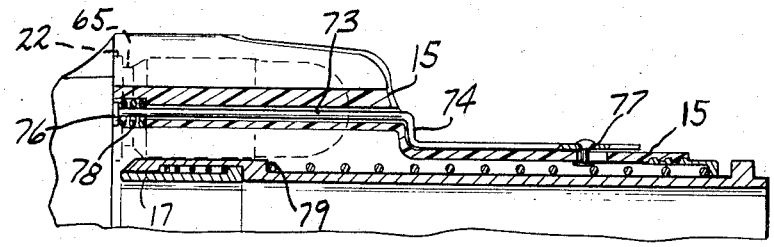
FIG. 6 is a partial sectional view of FIG. 5 in the plane of the line 6—6 and viewed in the direction shown.

Referring now to the drawings, the reference numeral 10 designates the barrel of a rifle used to support a grenade launcher indicated generally by the reference numeral 11. The launcher is connected to the barrel by means of a track and T-slot arrangement as indicated at 12—12.

The launcher 11 includes a bolt B, a firing pin P, a chamber C, a barrel D, a trigger mechanism T, and a receiver R.

A 40-millimeter cartridge F is shown positioned in the chamber C and upon actuation of the firing pin P the cartridge F is fired to drive projectile G through barrel D to the target.

Note that the barrel moves axially as a result of firing from a first position shown in solid lines, defined as the ready-to-fire position, to a second position shown in dotted lines representing the fired position.

Referring now in detail to FIGS. 2, 3 and 4, note that a barrel 16 shown in its first position or ready-to-fire position in FIG. 2 is slidably supported in a receiver 15 and is retained in the ready-to-fire position by coil spring 13 which engages the receiver at 14 and a shoulder 20 on the barrel.

Telescopically received within the barrel and movable relative to the barrel is a chamber 17 operative to receive a cartridge 18 having a projectile 19 and a cartridge case 21. Rim 22 of the cartridge case seats against the left edge 23 of chamber 17 as viewed in FIG. 2 and breech means defining a bolt 24 carrying a firing pin 26 makes face-to-face contact with the rear surface 27 of the cartridge.

Firing pin 26, powered by coil spring 28, is held in a cocked position by sear 29 and is operated by trigger crank 31 operable to pivot about pin 25 in response to a pull upon trigger cord 35 in the direction shown.

At the junction of the chamber 17 and the barrel 16 as indicated by the reference numeral 32, the chamber is formed with a pressure surface 33 opposing and making face-to-face contact with a corresponding pressure surface 34 formed on the barrel (see FIG. 3).

Upon the occurrence of firing cartridge 18, gas pressure generated is operative to enter the interface defined by the pressure surfaces 33 and 34 at junction 32 effective to drive the barrel to the right (see FIG. 3) and operative to hold chamber 17 firmly to the left to seal the chamber 17 and cartridge case 21 against the bolt to block the escape of hot gases.

The normal position or firing position of the chamber 17 with respect to the barrel 16 is as shown in FIG. 2. Coil spring 36 disposed between shoulder 37 on the barrel and shoulder 38 (FIG. 3) formed on the chamber is operative to urge these members into their normal position. The shoulders 37–38 and coil spring 36 cooperate to effect a lost-motion connection between barrel 16 and chamber 17.

After the occurrence of firing, the chamber 17 and the barrel 16 are disposed as shown in FIG. 3. Soon thereafter, the barrel, in its travel to the right, makes a driving connection with the chamber and both elements move to the right together. Before the barrel reaches the second position, coil spring 36 moves chamber 17 relative to the barrel and seats it in its normal position as shown in FIG. 4.

Thus, spent cartridge case 21 is uncovered to permit ejection.

Figure 7:
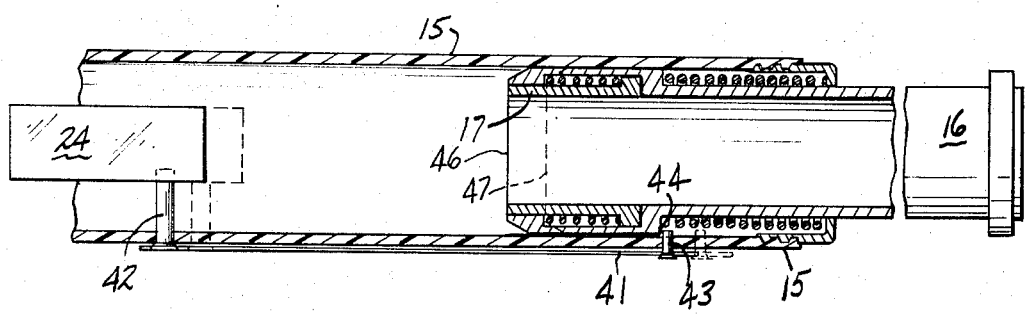
FIG. 7 is a sectional view of FIG. 5 as viewed in the plane of line 7—7, with certain parts broken away for clarity, showing the lost-motion connection between the bolt and the barrel.

Referring now to FIGS. 4 and 7, it is apparent that ejection is accomplished by the cooperation of bolt 24 and extractor 39.

The bolt 24 makes a lost-motion connection with the barrel 16 by means of a strap 41 slidably carried by the receiver 12. The strap 41 connects with the bolt as at 42 and is formed with an inwardly projecting lug 43.

As the barrel proceeds to the right as viewed in FIG. 7 and nears the end of its stroke, a cooperating lug 44 formed on the barrel collides with the lug 43 and drives the strap 41 and thus the bolt 24 to the right.

As the barrel moves from the solid line position referenced 46 in FIG. 7 to the dotted line position referenced 47, the bolt 24 is pulled to the right (see FIG. 4) to accomplish the ejection function in cooperation with the extractor 39.

Referring to FIGS. 2 and 4, note that the motion of bolt 24 to the right during the ejection function also operates to cock the firing pin 26 in that firing pin collar 40 abuts trigger guard 45 holding the striker stationary while the bolt 24 moves forward compressing striker spring 28 and permitting sear 29 to engage mating firing pin notch 30 to retain the striker in a cocked position.

The receiver carries a pivoting barrel latch 49 (see FIGS. 1, 2 and 4) biased so that the latch is constantly urged inwardly into a blocking or latching position relative to the left end 51 of the barrel.

Thus, upon the occurrence of ejection and as the left end 51 of the barrel reaches the position shown in FIG. 4, the latch 49 jumps inwardly into blocking or latching position holding the barrel extended to the right against the tendency of coil spring 13 to urge the barrel to the left.

The barrel is held latched to the right until released by a cartridge or round, fed from one of the magazine pods, strikes the latch releasing it in a manner to be described in greater detail later.

Referring to FIGS. 5, 5A, 5B, and 5C, note that the receiver 15 is formed with two magazine pods 52 and 53 each having a capacity for one 40-millimeter cartridge 54–56.

The receiver 15 is also fitted with a switch means indicated generally by the reference numeral 57 operative to select the sequence of cartridge feeding from the pods to the chamber 17.

In addition, the receiver carries a pair of cut-offs indicated generally by the reference numerals 58 and 59.

The cut-offs control feeding of the cartridges 54 and 56 after the switch means 57 selects the sequence of feeding.

The switch means 57 comprises a rod or bar 61 movable to and fro in the receiver 15 (from right to left as viewed in FIG. 5) where the stroke of the bar 61 is limited by an elongated slot 62 formed in the bar and the pin 63 carried by the receiver.

The bar 61 is formed with opposed beveled ends 64 (left) and 66 (right) as shown in FIG. 5C. The bar is freely movable and is operated by the insertion of cartridges 54–56 (into the magazine pods) in that the first cartridge inserted (cartridge 54 in FIG. 5) operates to cast the bar 61 to the right into a position shown in FIG. 5.

Subsequent insertion of round 56 causes right bevel 66 to engage undercut 65 (see FIG. 6) to develop a blocking relationship between the right bevel 66 and the rim 22 of cartridge 56 precluding feeding of cartridge 56 into chamber 17 until the cartridge 54 is fed. As is apparent in FIG. 5A, cartridge 56 is blocked against motion in the direction shown by the arrow 50 until cartridge 54 moves out of its pod. Note also that cartridge 54 is holding bar 61 to the right in that its rim 22 is bearing against bevel 64. After cartridge 54 is fed the bar 61 is free to slide to the left to free cartridge 56.

Each magazine pod 52–53 is provided with a door or follower indicated by the reference numerals 67 and 68.

Figure 8:
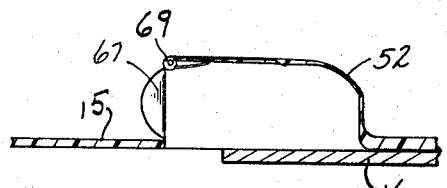
FIG. 8 is a sectional view of the left pod (as viewed in FIG. 5) with the cartridge removed and showing the pod cover or follower in the normal position.

The followers, saddle-shaped, are hinged to the pod as at 69 (FIG. 8), and are spring-pressed to assume the position shown.

Figure 8A:
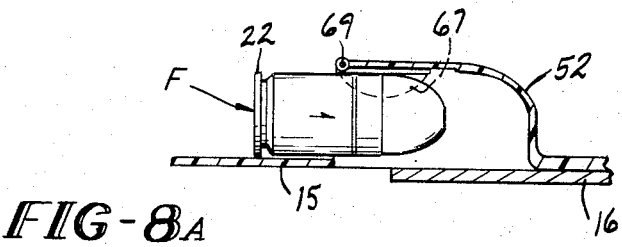
FIGS. 8A through 8C are similar to FIG. 8 showing the sequence of steps practiced in loading a pod with a cartridge and the subsequent feeding of the cartridge into the chamber.
Figure 8B:
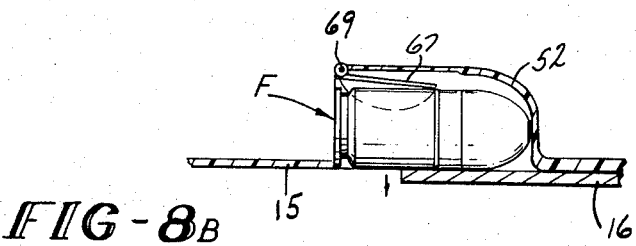
Figure 8C:
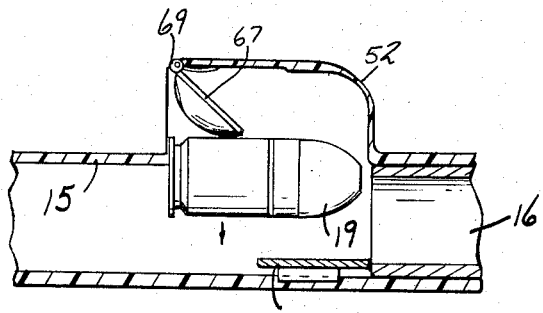

Referring to FIGS. 8A, 8B, and 8C, note that the insertion of a cartridge F in the direction shown is operative to rotate the follower about hinge 69 to the position of FIG. 8B.

In this position, the 40-millimeter cartridge F is urged downwardly by the follower against the exterior surface of barrel 16.

A 40-millimeter cartridge is loaded into the magazine in the following fashion.

As previously described, the barrel moves from its first position to its second position during firing. The barrel is latched in its second position by the operation of barrel latch 49, previously described. As soon as the barrel and chamber reach the position shown in FIG. 4 (after the occurrence of ejection), follower 67 drives cartridge F downwardly (the rim 22 of the cartridge is guided by track means 71–72 shown in FIG. 5A) to the point where the projectile 19 strikes latch 49 releasing barrel 16. The barrel immediately moves to the left, telescoping over the cartridge, and chambering the cartridge. The chambered cartridge drives bolt face 24 to the left and extractor 39 engages the cartridge to assume the position shown in FIG. 2.

As stated previously, the magazine pods are fitted with cut-offs 58 and 59 operative to control cartridge feeding in cooperation with the switch means 57. Since each cut-off is of the same structure and operation, only one cut-off, namely 58, will be described in detail recognizing that cut-off 59 is arranged and operates in similar fashion.

Figure 6A:
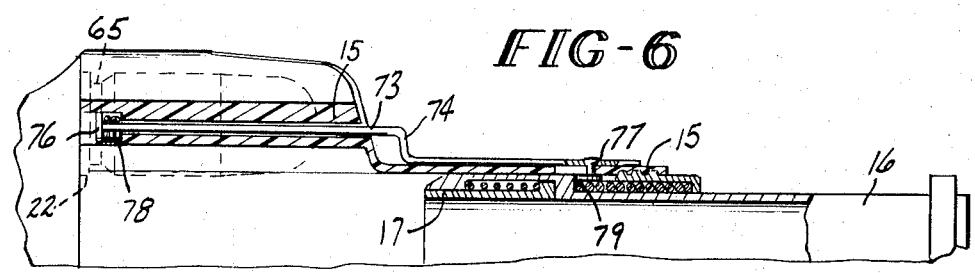
FIG. 6A is a schematic illustration of the connection between the barrel and the cut-offs showing the cut-offs in the operated position.

Referring to FIGS. 6 and 6A, each cut-off comprises a strap 73, offset as at 74, carried by the receiver 15. One end of the strap 73 is formed with an operating head 76 and the opposite end is formed with an actuating lug 77.

The cut-off strap 73 and its actuating head 76 is held in the normal or blocking position by means of a coil spring 78.

In the normal position (see FIGS. 5A and 6), the operating head 76 is in line with the rim 22 of a cartridge and prevents or blocks motion of the cartridge towards the chamber in response to the urging of follower 67.

The barrel is formed with a cooperating lug 79 which forms a lost-motion connection with the lug 77 to drive the strap 73 to the right from the position shown in FIG. 6 to the position shown in FIG. 6A wherein operating head 76 is moved forward (to the right) out of alignment with rim 22 to a position complementary to undercut 65.

In the position of FIG. 6A, operating head 76 no longer blocks its mating cartridge and, if the selector switch bar 61 so indicates, movement of the strap 73 from the position of FIG. 6 to that of FIG. 6A will permit a cartridge to feed into the chamber.

Note that the cut-offs retain the cartridges blocked in their mating magazine pods until an instant just prior to the time that the barrel 16 has reached its second position and is latched open.

Referring now to FIGS. 5, 5A, and 5B, the operating heads 76 and 81 of the cut-offs 58 and 59, respectively, are shown in three different positions relative to cartridges 54 and 56, barrel 17, and the switch means 57.

FIG. 5 shows the barrel closed as in FIG. 2 with the exterior surface of the barrel 16 bearing upon the rims of cartridges 54 and 56 holding the cartridges outwardly in the direction shown by the arrows against the tendency of followers 67 and 68 to drive the cartridges inwardly.

Since cartridge 54 has been loaded into its magazine pod first, the switch means 57 has been cast to the right blocking cartridge 56.

In this position, the cut-offs 58 and 59 are in their normal position (corresponding to the position of FIG. 6), but the operating heads 76 and 81 do not block cartridges 54 and 56 because the cartridges are being held radially outward and away from the operating heads by the exterior surface of closed barrel 16.

In FIG. 5A, the barrel is partially opened, i.e. moved to the right as viewed in FIG. 2 or 4 to the point that the exterior surface of the barrel 16 no longer supports the cartridges 54–56. In other words, the barrel is somewhere between its first position and its second position clear of contact with cartridges.

In this condition, the representation of FIG. 5A shows both operating heads 76 and 81 in blocking contact with their mating rims 22 of 40-millimeter cartridges 54 and 56, respectively. Switch means 57 remains unchanged and corresponds to the illustration of FIG. 5.

Just before the barrel 16 arrives at the second position, cut-offs 58 and 59 are actuated in that mating lugs 77 and 79 encounter one another operative to haul operating heads 76 and 81 to the right against their respective coil springs 78—78 effective to clear both cartridges 54 and 56 for feeding downwardly and inwardly towards chamber 17.

Only cartridge 54 will feed in response to its follower 67 because selector means 57 blocks the advance of cartridge 56.

As stated previously, when cartridge 54 moves in the direction of the arrow shown in FIG. 5B, latch 49 is tripped, freeing the barrel and chamber to move to the left (as viewed in FIG. 2) enveloping cartridge 54.

Obviously, as soon as the barrel begins traversing to the left, the interference between lugs 77 and 79 is eliminated and the cut-offs return to their operated position shown in FIG. 6. After the firing of cartridge 54, the cycle just described reoccurs and when the cut-offs are next actuated, cartridge 56 moves inwardly similar to the previous motion of cartridge 54 and this cartridge is chambered.

When cartridge 56 feeds in response to its follower 68 the switch bar 61 is driven to the left by the head of the cartridge.

In other words, cartridge 56 is no longer blocked by switch means 57 since the switch bar 61 is freely movable to the left into the space formerly occupied by cartridge 54.

OPERATION

The disclosed embodiment of the invention operates in the following fashion: assume that barrel 16 is latched opened in the position shown in FIG. 4 and both magazine pods are empty.

Three cartridges may be loaded into the firearm. A first cartridge inserted into magazine pod 52 shifts the switch bar 61 to the right and since the barrel 16 is latched opened, the cartridge will feed immediately to chambering position actuating barrel latch 49 permitting the barrel 16 and its accompanying chamber 17 to telescope or envelop the cartridge to assume the position shown in FIG. 2.

Next, cartridge 54 is fed into magazine pod 52. Thereafter, cartridge 56 is fed into magazine pod 53.

FIGS. 2 and 5 shows the relative disposition of the various piece parts at this time. Since cartridge 56 is blocked by switch bar 61, cartridge 54 is selected to feed first after cartridge 21 (the first cartridge inserted) is fired.

Upon firing cartridge 21, the gas pressure generated penetrates interface 32 and operates on pressure surfaces 33 and 34 to drive chamber 17 and barrel 16 in opposite directions.

Soon thereafter, the lost-motion connection between the chamber and the barrel is operative and gas pressure drives the barrel with the chamber to the second position latching the barrel open as shown in FIG. 4. Coil spring 36 has moved the chamber to its normal position relative to the barrel.

At this point, it is well to note that the barrel in its travel from the first position to the second position is buffered or stopped by at least three elements, namely (1) the compressive strength of barrel spring 13, (2) the compressive strength of firing pin spring 28, and (3) the compressive strength of cut-off spring 78—78.

As previously described, three functions occur as the barrel approaches its second position. First, the lost-motion connection between the barrel and the bolt is operative to eject a spent cartridge such as the cartridge 21 in FIG. 4 in cooperation with extractor claw 39. Secondly, the firing pin 26 is cocked by the cooperation of sear 29 and firing pin notch 30. Third, the cut-offs 58 and 59 are actuated to permit cartridge 54 to feed into chamber position in response to the urging of its follower 67.

Upon this occurrence, latch 49 is tripped and the chamber and magazine envelop cartridge 54 in the fashion previously described.

Thereafter, operation of trigger 31 to drive sear 29 in well-known fashion frees firing pin 26 to actuate cartridge 54.

Upon this occurrence, the cycle just described ensues and after ejection of the spent cartridge 54 and upon operation of cut-offs 58 and 59, cartridge 56 moves into chamber position tripping latch 49 and the cycle just described is repeated.

It is anticipated that a wide variety of embodiments of the present invention may be devised without departing from the spirit and scope of the invention.

What is claimed is:

1. A firearm device comprising a receiver, a barrel slideably mounted in the receiver and moveable axially from a first position defining a ready-to-fire position to a second position defining a fired position, a cartridge chamber member telescopically received in said barrel, a lost-motion connector between said barrel and said cartridge chamber member, and breech means carried by said receiver operative to close the cartridge chamber member, said barrel and said cartridge chamber member having opposed pressure surfaces exposed to gas pressure generated upon firing a cartridge effective by virtue of said lost-motion connector to drive said barrel toward said second position and further effective to hold said cartridge chamber member in firm contact with said breech means for an interval of time until the lost-motion in said connector is taken up whereupon said barrel moves said cartridge chamber member away from said breech means in the direction of movement of said barrel.

2. The firearm device of claim 1 further including cartridge extractor means mounted on said receiver for engaging the rim of a cartridge, said breech means including a moveable bolt, and means on said barrel for moving said bolt relative to said extractor means in the direction of movement of said barrel when said barrel moves into its second position to eject a cartridge.

3. A grenade launcher suitable for attachment to a rifle comprising a receiver, an axially moveable barrel slideably mounted in the receiver and moveable from a first position defining a firing position to a second position defining a fired position, a floating cartridge chamber telescopically received in said barrel and having a lost-motion connection therewith, breech means carried by said receiver and operative to close the chamber, said barrel and said chamber having opposed pressure surfaces exposed to gas pressure generated upon firing a cartridge effective by virtue of said lost-motion connection to drive the barrel toward said second position and further effective to hold the chamber in firm contact with said breech means for an interval of time until the lost-motion in said connection is taken up whereupon said barrel moves said chamber away from said breech means in the direction of movement of said barrel, a plurality of magazine pods formed in said receiver and communicating with said receiver when said barrel is in said second position, and switch means in said receiver operable to selectively permit feeding of a cartridge from one of said pods to said chamber while preventing the feeding of a cartridge from another of said pods.

4. The launcher of claim 3 further including cartridge cutoffs mounted in said receiver and preventing the feeding of the cartridges in said pods to said chamber when said barrel is in its first position, and means operable upon movement of said barrel into said second position for moving said cutoffs out of their feed preventing position.

References Cited

UNITED STATES PATENTS

| | | | |
|---|---|---|---|
| 2,835,171 | 5/1958 | Lyon | 89—161 X |
| 2,982,043 | 5/1961 | Katz et al. | 42—39.5 |
| 2,982,181 | 5/1961 | Panzica | 42—39.5 X |

FOREIGN PATENTS

| | | |
|---|---|---|
| 180,238 | 5/1922 | Great Britain. |

BENJAMIN A. BORCHELT, *Primary Examiner.*